United States Patent

Arai et al.

[11] Patent Number: 5,812,696
[45] Date of Patent: Sep. 22, 1998

[54] CHARACTER RECOGNIZING METHOD AND APPARATUS

[75] Inventors: Tsunekazu Arai, Tama; Katsuhiko Sakaguchi, Kawasaki; Shigeki Mori, Koshigaya; Kazuhiro Matsubayashi; Takashi Harada, both of Yokohama, all of Japan

[73] Assignee: Canon Kabushiki Kaisha, Tokyo, Japan

[21] Appl. No.: 869,223

[22] Filed: Jun. 4, 1997

Related U.S. Application Data

[63] Continuation of Ser. No. 415,589, Apr. 3, 1995, abandoned, and a continuation of Ser. No. 79,566, Jun. 22, 1993, abandoned.

[30] Foreign Application Priority Data

Jun. 25, 1992 [JP] Japan ................................. 4-167678

[51] Int. Cl.⁶ ....................................................... G06K 9/00
[52] U.S. Cl. ............................ 382/185; 382/187; 382/203
[58] Field of Search .................................. 382/177, 187, 382/192, 195, 197–203, 227, 185

[56] References Cited

U.S. PATENT DOCUMENTS

| | | | |
|---|---|---|---|
| 4,151,512 | 4/1979 | Riganati et al. | 382/124 |
| 4,284,975 | 8/1981 | Odaka | 382/23 |
| 4,531,231 | 7/1985 | Crane | 382/13 |
| 5,023,918 | 6/1991 | Lipscomb | 382/202 |
| 5,121,441 | 6/1992 | Chefalas et al. | 382/13 |
| 5,121,442 | 6/1992 | Togawa et al. | 382/13 |

FOREIGN PATENT DOCUMENTS

| | | | |
|---|---|---|---|
| 55-80183 | 6/1980 | Japan | G06K 9/20 |
| 58-169296 | 10/1983 | Japan | G06K 9/62 |
| 62-39460 | 8/1987 | Japan | G06K 9/46 |
| 64-21588 | 1/1989 | Japan | G06K 9/62 |
| 2-105281 | 4/1990 | Japan | G06K 9/62 |

*Primary Examiner*—Christopher S. Kelley
*Attorney, Agent, or Firm*—Fitzpatrick, Cella, Harper & Scinto

[57] ABSTRACT

The invention has means for judging the characteristics of a character from a feature amount of one inputted character, thereby allowing a suitable character recognizer to be adapted to the input character in accordance with the feature amount of the input character. According to the invention, since the means for judging the characteristics of a character in accordance with the feature amount of the inputted character, a size of input character is not limited. Each suitable recognizer is naturally selected in accordance with the feature amount of the inputted character. The input character can be more accurately recognized.

15 Claims, 7 Drawing Sheets

CHARACTER RECOGNIZING METHOD AND APPARATUS

This application is a continuation of application Ser. No. 08/415,589 filed Apr. 3, 1995, now abandoned, and Ser. No. 08/079,566 filed Jun. 22, 1993, now abandoned.

BACKGROUND OF THE INVENTION

1. Field of the Invention

The present invention relates to character recognizing method and apparatus in which even in the case a plurality of kinds of characters such as kanji (or chinese character), kana (or Japanese character), alphabetical character, numeral, and the like are mixedly inputted, the characters can be recognized by a recognition algorithm suitable for each input character.

2. Related Background Art

Hitherto, there is an apparatus which recognizes all of input characters by one kind of recognizing algorithm and one kind of dictionary. According to such an apparatus, however, there is a case where a predetermined recognizing algorithm cannot be applied to the input character in dependence on the kind or characteristics of the input character, and a variation occurs in the results of recognition regarding whether the input character could be correctly recognized or not. On the other hand, in the case where the number of kinds of dictionaries is equal to one and all of the standard patterns as targets to be recognition have been stored, it takes a time to match with all of the standard patterns and a recognizing efficiency is low.

Hitherto, there is an apparatus such that an independent dictionary or recognizing algorithm is provided for each kind of characters which are inputted and the character type is designated each time a character pattern is inputted, and the dictionary or recognizing algorithm is switched.

According to the above method of further inputting additional data (data to designate the character type) each time a character pattern is inputted, however, double labors are needed, a continuity of the inputting operation of a character train is obstructed, or the like. An operating efficiency, consequently, is low.

Hitherto, in case of a slip or the like in which characters which are inputted can be predicted each input area, the character type is previously designated for an input area and the character pattern which has been inputted to the input area is recognized by a method suitable to the character type designated for such an area.

Such a method, however, can be applied to only a document such as a slip or the like having a fixed format, and a degree of freedom is low.

Hitherto, as disclosed in JP-A-64-21588, there is an apparatus in which a large input character is judged to be a "kanji" and a small input character is decided to be a "kana", alphabetical character, or numeral on the basis of a size of character which is inputted or a position in a character frame, and the input character is recognized by a recognizing algorithm suitable for each character type.

However, the size of character or the position of character in the character frame varies in dependence on a personal habit of the person who inputs the character or a situation at the time of the inputting operation. The size of input character is not always constant in dependence on the character type, so that a recognition rate is not improved.

SUMMARY OF THE INVENTION

The invention has a plurality of recognizing algorithms so as to correspond to the recognition of character patterns having various characteristics.

It is an object of the invention to obtain the following effects:

1) there is no need to input additional data such as data to designate a recognizing algorithm in addition to a character pattern, and 2) a recognition is not limited by an input area, by judging an inputted character pattern on the basis of a feature of the strokes of the inputted character pattern when a proper algorithm is selected from a plurality of recognizing algorithms.

Another object of the invention is that by selecting a proper recognizing algorithm on the basis of the feature of strokes of an inputted character pattern, the inputted character pattern can be judged in accordance with the characteristics at a high fidelity as compared with a judging method based on the size whereby a recognition difference occurs depending on the person who inputs a character pattern or a mental state at the time of the inputting operation.

Still another object of the invention is that characters to which each recognizing algorithm is applied are classified by the characteristics of the strokes of character irrespective of the exisiting classification such as a character type (kanji, kana, alphabetical character, numeral, or the like), for example, in case of the characters such as " z " and " ɤ " whose characteristics are close to those of "kana" although they are "kanji" characters, the algorithm for "kana" is selected, and the inputted character can be recognized by the recognizing algorithm which can further raise a recognition rate.

Further another object of the invention is to obtain the following effects:

1) a feature can be easily extracted, 2) the apparatus can correspond to both of the rectilinear stroke and the curve stroke, and 3) feature data can be simplified, by a method whereby the feature of character pattern is not recognized by the dots constructing the pattern but is recognized by vectors of partial strokes which are obtained by dividing the stroke.

DETAILED DESCRIPTION OF THE PREFERRED EMBODIMENTS

Embodiments of the present invention will now be described in detail hereinbelow.

Figure 2:
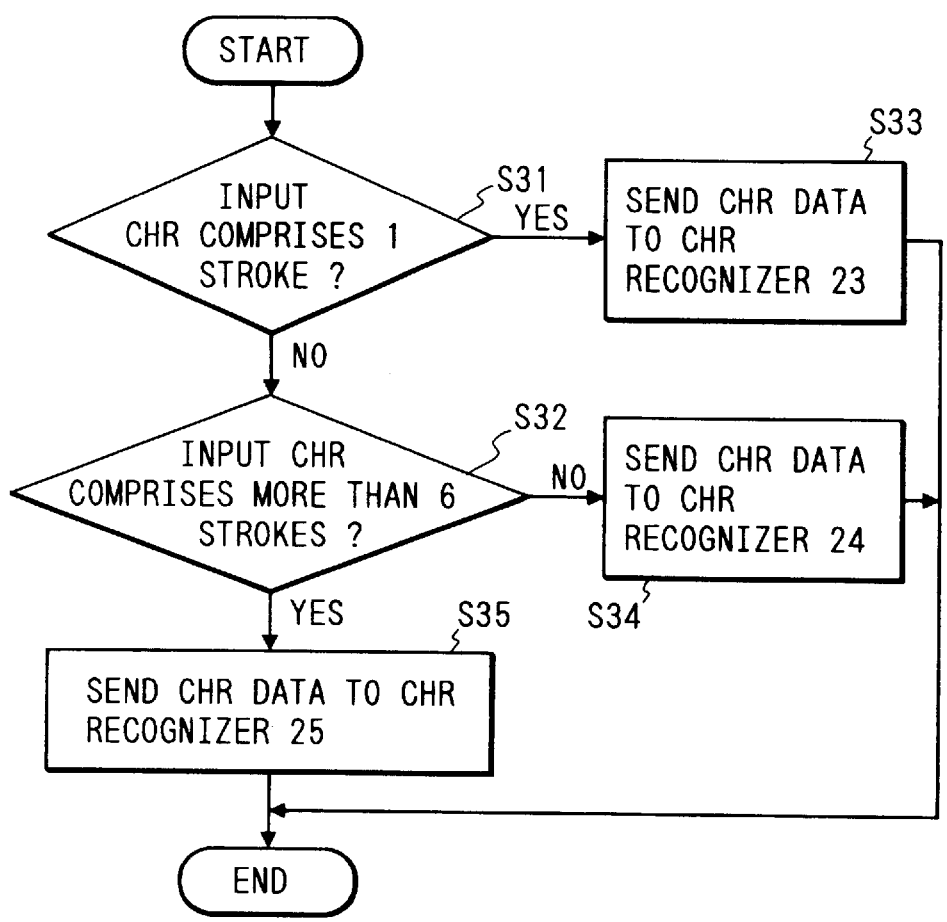
FIG. 2 is a flowchart for the first embodiment.
Figure 5:
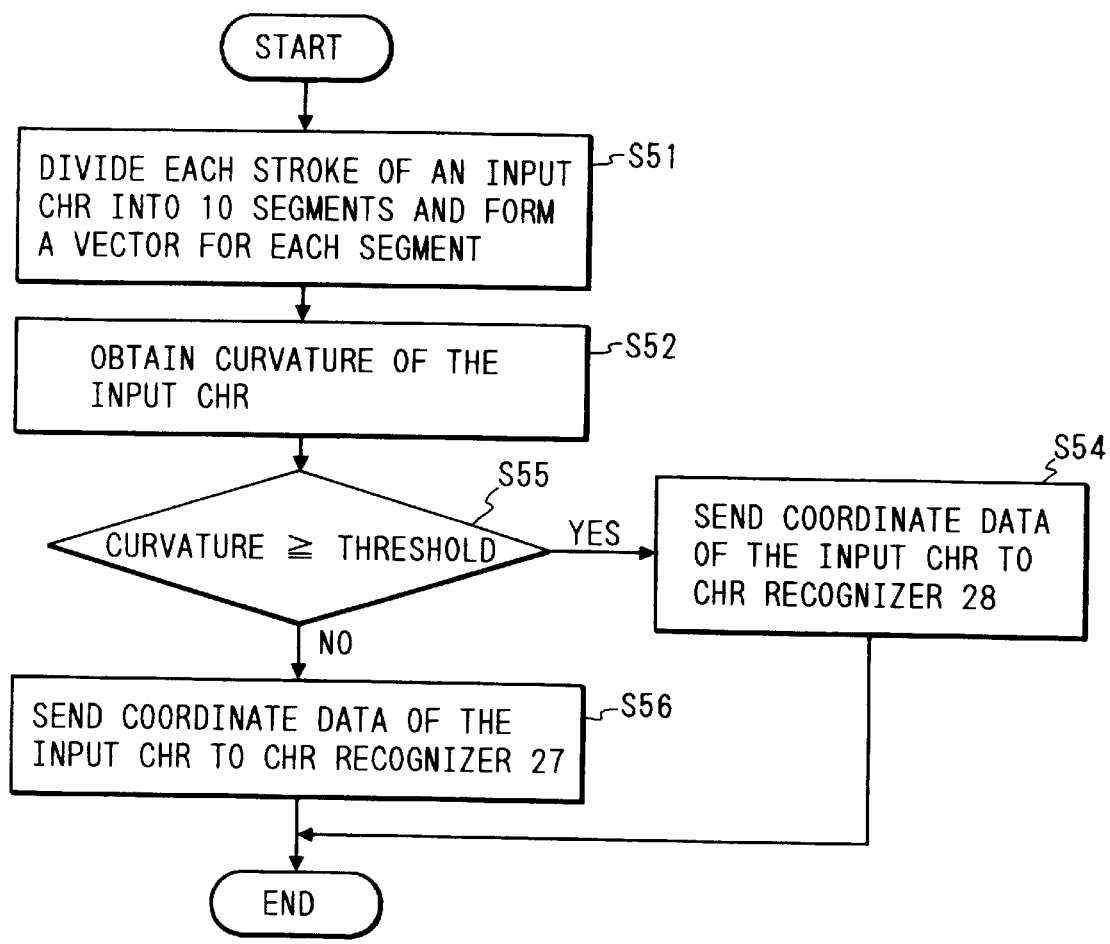
FIG. 5 is a flowchart for the second embodiment.
Figure 8:
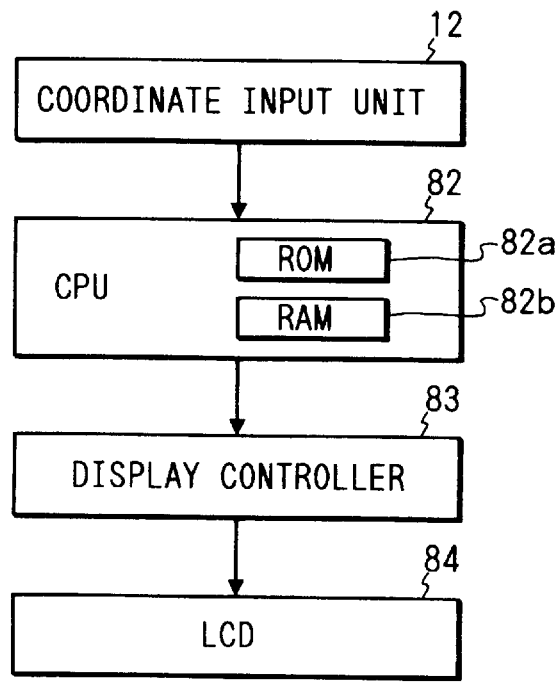
FIG. 8 is a diagram showing an example of a construction of a whole apparatus.

First, a construction of a whole apparatus will be described with reference to FIG. 8. Reference numeral 12 denotes a coordinate input unit. For example, an input plate in which a number of electrodes are arranged in both of the vertical and lateral directions or the like is used and the coordinate values of the position pressed by using an input pen 11 are inputted in the coordinate input unit 12. The coordinate data is sent to a central processing unit (hereinafter, simply referred to as a CPU) 82. In the CPU 82, reference numeral 82a denotes an ROM to store control programs for executing processes, for example, as shown in flowcharts of FIGS. 2 and 5 and a character pattern dictionary, and reference numeral 82b indicates an RAM to store various kinds of data. In accordance with the control programs stored in the ROM 82a, the CPU 82 executes the processes as shown in the flowcharts of FIGS. 2 and 5. The coordinate values which are inputted from the coordinate input unit 12 are stored in the RAM 82b as pattern data which is inputted in the input unit 12. The inputted character values are subjected to a matching process with each of the pattern data in a character pattern dictionary stored in the ROM 82a, thereby obtaining a similarity. The character data which is determined by the similarity is outputted to a display controller 83 as a result of the recognition. The character pattern as a result of the recognition is displayed on a liquid crystal display unit (LCD) 84 under the control of the display controller 83.

(Embodiment 1)

Figure 1:
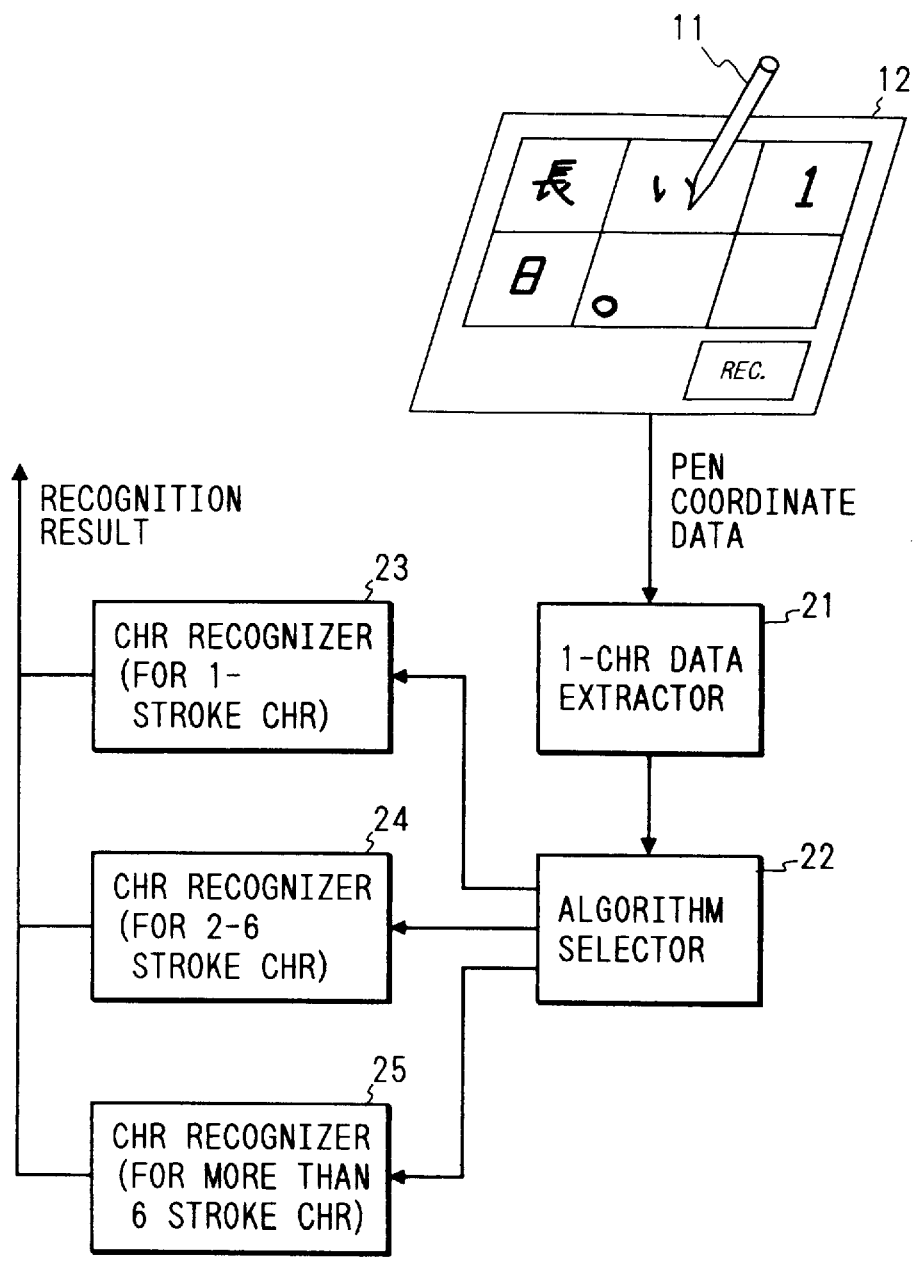
FIG. 1 is a constructional diagram of the first embodiment of the invention.
Figure 3:
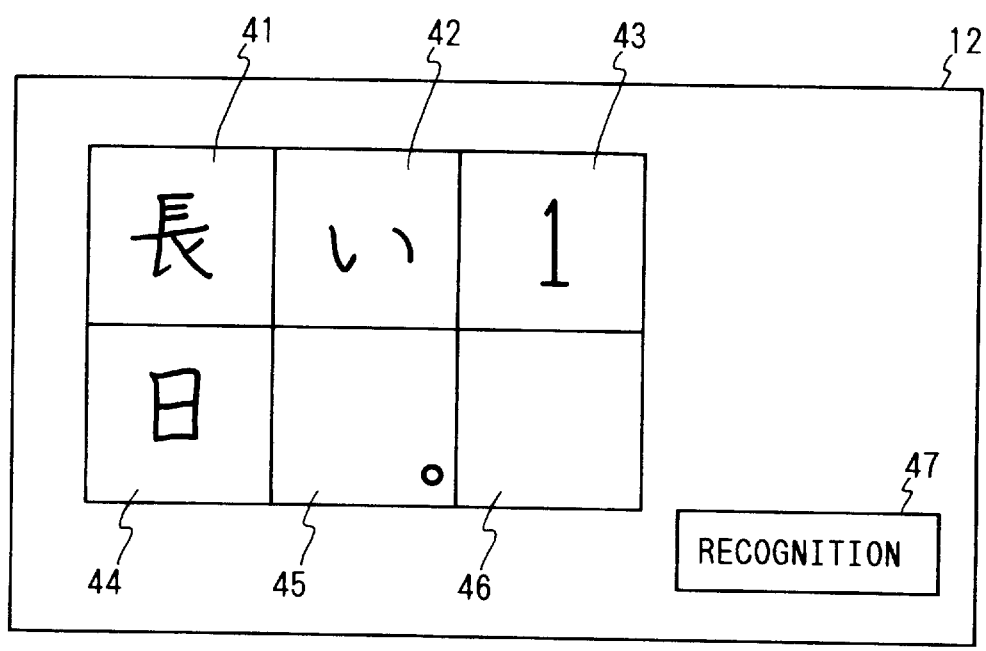
FIG. 3 is a diagram showing an input example of the first embodiment.

FIG. 1 is a block diagram mainly showing a construction of a recognition unit of a character recognition processing apparatus according to the first embodiment of the invention. FIG. 2 is a flowchart for executing an algorithm selecting process on the basis of the number of strokes of an input character. FIG. 3 shows an example of an input picture plane.

In FIG. 1, reference numeral 11 denotes the pen to input characters and 12 indicates the coordinate input unit having an input board on which a number of transparent electrodes are arranged in both of the vertical and lateral directions. A character pattern is inputted onto the input board by using the input pen 11. The coordinate data of the position depressed by the input pen 11 is inputted.

The coordinate data which is sequentially inputted by the input pen 11 is sent to a 1-character data extracter 21. The extracter 21 receives the coordinate data of the pen which is supplied from the input unit 12 and stores into the RAM 82b. When a "recognition" key 47 in FIG. 3 is depressed by the pen 11, the coordinate data of the characters which has been stored so far is sent every character to an algorithm selector 22 according to the number of strokes of the input character.

The extracting process of every character of the inputted coordinate data which is executed by the 1-character data extracter 21 is performed by a conventional discriminating method by character frames. Reference numerals 41, 42, 43, 44, 45, and 46 shown in FIG. 3 denote character frames. The coordinate data of each character frame is previously stored in the RAM 82b. The inputted coordinate data is compared with the coordinate data of the character frame, thereby judging to which character frame the coordinate data belongs. The coordinate data which has been inputted to each character frame is divided as coordinate data of one character. Now, assuming that characters were inputted as shown in FIG. 3, " 长 " (which reads "naga" and means "long") is written in the area of the character frame 41. The divided character data is sequentially sent to the algorithm selector 22 based on the number of strokes of the input character in accordance with the order of the character frames. Therefore, when the characters are inputted as shown in FIG. 3, the character data is sent in accordance ith the order of the characters such as " 长 ", " い ", "1", " 日 ", and "o".

" 长 " (which reads "naga" and means "long")
" い " (which reads "i")
"1" (which reads "ichi" and means "one")
" 日 " (which reads "nichi" and means "day")
" 长 " " い " "1" " 日 " (which reads "nagai ichinichi" and means "one long day")

The algorithm selector 22 based on the number of strokes of input character receives the coordinate data which has been divided every character by the 1-character data extracter 21 and judges the number of strokes of the one-character data from the UP/DOWN information of the input pen 11 regarding the data of one character. After that, the processes shown in the flowchart of FIG. 2 are executed under control of the CPU 82 in accordance with the programs stored in the ROM 82a. The coordinate data for one character is sent to each of recognizers 23, 24, and 25 in accordance with the number of strokes of the input character. Processes shown in a flowchart of FIG. 2 will be described hereinbelow.

Reference numeral 23 in FIG. 1 denotes the character recognizer for a character of one stroke. The recognizer 23 executes a recognition by, for example, an algorithm of the feature point method disclosed in JP-B-62-39460 or the like and generates the result of the recognition.

Reference numeral 24 in FIG. 1 denotes a character recognizer for a character in which the number of strokes lies within a range from 2 to 6. The recognizer 24 performs a recognition by, for example, an algorithm of a well-known fundamental stroke vector method and generates the result of the recognition.

Reference numeral 25 in FIG. 1 denotes a character recognizer for a character in which the number of strokes is equal to or larger than 7. The recognizer 25 performs a recognition by, for example, a recognizing algorithm as shown in JP-B-57-6151 or the like such that an input character is recognized by the sum of distances between the start points and end points of the input character and the start point and end point of a dictionary pattern and generates the result of the recognition.

Processing operations of the embodiment will now be described with reference to the flowchart of FIG. 2.

First, in step S31, a check is made to see if an input character indicates a character pattern such that the number of pen lifting-up times is equal to 1 and the number of pen lifting-down times is equal to 1, namely, whether the input character indicates a character pattern of one stroke or not. If YES, step S33 follows and the character data is sent to the 1-character recognizer 23 in step S33.

When it is decided in step S31 that the input character doesn't indicate a character pattern of one stroke, step S32 follows. It is now assumed that the characters are inputted as shown in FIG. 3, the data of one character is sequentially sent from the 1-character data extracter 21 in accordance with the order of " 长 ", " い ", "1", " 日 ", and "o". In case of " 长 ", the number of pen lifting-up times is equal to 8 and the number of pen lifting-down times is equal to 8 and it is decided that it is a character pattern of eight strokes, so that the processing routine advances to step S32. Since " い " is a character pattern of two strokes, the processing routine also advances to step S32. Since "1" is a character pattern of one stroke, the processing routine advances to step S33. Since " 日 " is a character pattern of four strokes, step S32 follows. Since "○" is a character pattern of one stroke, step S33 follows.

In step S32, a check is made to see if the number of strokes of the input character is equal to or larger than 7 or not. When it is less than 7, step S34 follows. In step S34, since the number of character data lies within a range from 2 to 6, the character data is sent to the character recognizer 24. When the number of strokes of the input character is equal to or larger than 7, step S35 follows. In step S35, since the number of strokes of the character data is equal to or larger than 7, the character data is sent to the character recognizer 25.

When " 委日 " is sent in step S32, since the number of strokes of " 委 " is equal to 8, step S35 follows. Since the number of strokes of " い " is equal to 2, step S34 follows. Since the number of strokes of " 日 " is equal to 4, step S34 follows.

By executing the processes as described above, the character of one stroke such as "1" or "○" is recognized by using the recognizer using the algorithm suitable for the character of one stroke. The character such as " い " or " 日 " in which the number of strokes lies within a range from 2 to 6 is recognized by the recognizer using the algorithm suitable for the character in which the number of strokes lies within a range from 2 to 6. The character such as " 委 " of 7 strokes or more is recognized by using the algorithm suitable for the character of 7 strokes or more. The recognizer suitable for different characteristics can be applied without allowing the user to be aware of the recognizer in accordance with the number of strokes of the character. A more accurate recognizing method can be realized.

(Embodiment 2)

Figure 4:
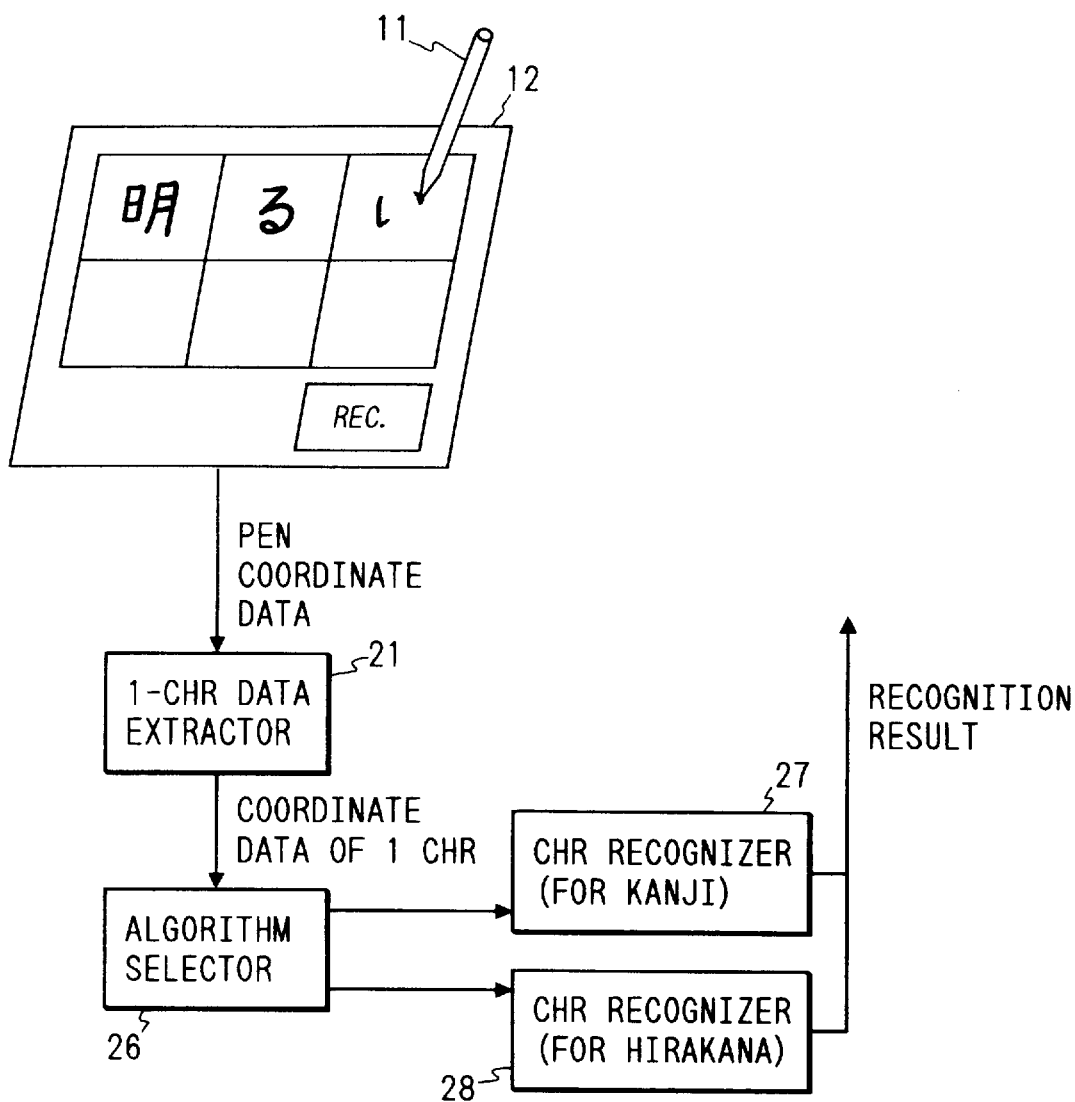
FIG. 4 is a constructional diagram of the second embodiment of the invention.

Although the embodiment 1 has been described with respect to the processes such that an attention is paid to the number of strokes as a feature amount of an input character as a reference when the recognizing algorithm is selected, the algorithm suitable for the input character can be used in accordance with a curvature of the stroke of the input character by replacing the algorithm selector 22 based on the number of strokes of the input character to an algorithm selector 26 based on a curvature of the stroke of the input character shown in FIG. 4.

Figure 6:
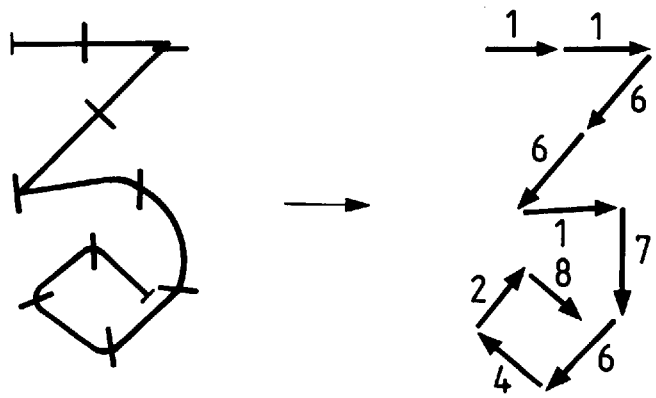
FIG. 6 is a conceptual diagram to form a vector of a stroke.
Figure 7:
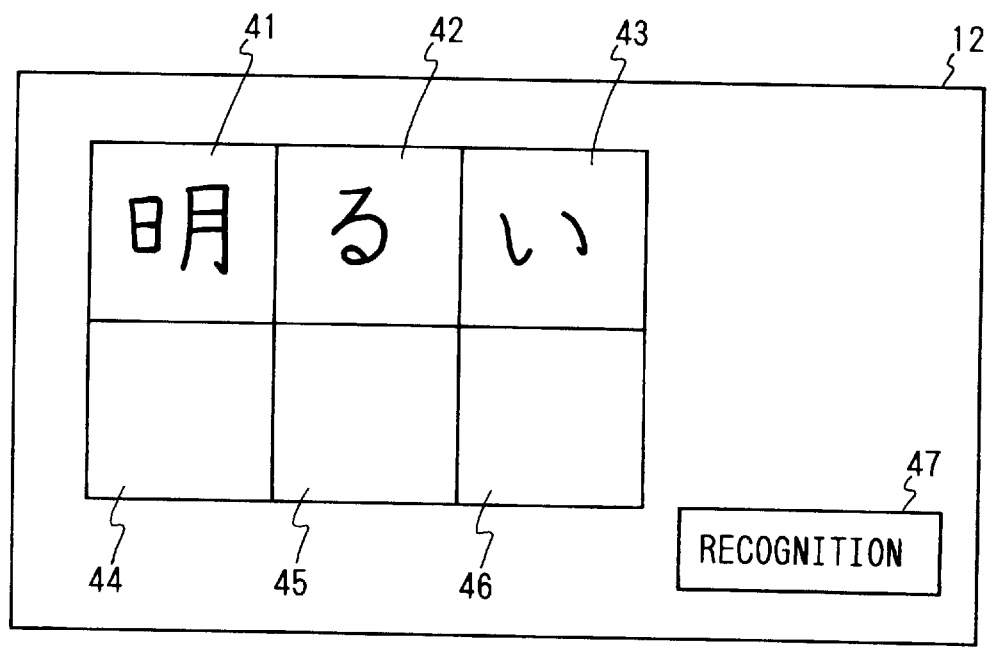
FIG. 7 is a diagram showing an input example of the second embodiment.

FIG. 4 is a block diagram showing a construction of a character recognition processing apparatus in the embodiment 2. FIG. 5 is a flowchart showing algorithm selecting processes based on the curvature of the stroke of the input character as a feature of the embodiment. FIG. 6 is a conceptual diagram to form a vector for the stroke. FIG. 7 shows an example of the input picture plane.

In FIG. 4, the 1-character extracter 21 executes processes similar to those described in detail in the embodiment 1. The algorithm selector 26 by the curvature of the stroke of the input character executes the processes shown in a flowchart of FIG. 5 under control of the CPU 82 in accordance with the programs stored in the ROM 82a. The processes will be explained in detail hereinbelow. In brief, each stroke of the coordinate data of one character which is sent from the 1-character data extracter 21 is divided into ten equal segments on the basis of the distance. Direction change amounts of ten vectors are set to curvatures of the strokes. When the curvature is large, the coordinate data of one character is sent to a character recognizer 28 for "hirakana" (Japanese character). When the curvature is small, the coordinate data of one character is sent to a character recognizer 27 for "kanji" (chinese character).

The character recognizer 27 for "kanji" recognizes a character by a conventional algorithm by the calculation of the distance between the start point and the end point or the like and generates the result of the recognition. The character recognizer 28 for "hirakana" recognizes the character by a conventional algorithm by a feature point method which is strong to the curve component or the like and generates the result of the recognition.

The processing operations of the algorithm selector 26 by the curvature of stroke of an input character will now be described with reference to the flowchart shown in FIG. 5.

Figure 9:
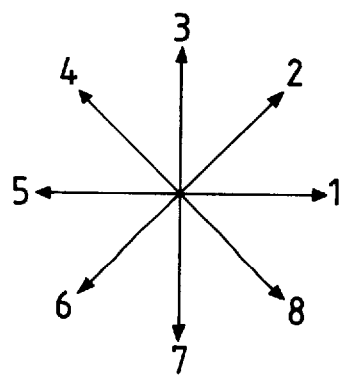
FIG. 9 is a diagram showing a fundamental vector.

First, in step S51, each stroke of the input character is divided into ten equal segments with respect to the distance. A line segment is set into vectors in eight directions in accordance with the angle. For example, explanation will now be made with reference to FIG. 6. When a character " る " is inputted, the stroke from the pen lifting-down operation to the pen lifting-up operation is divided into ten equal segments as shown on the left side. The positional correlation between the start point and end point of each of the partial strokes divided into ten equal segments is judged, thereby deciding to which one of the eight fundamental directional vectors as shown in FIG. 9 each segment corresponds. Due to this, either one of the eight directional vectors is decided with respect to each of the ten partial strokes obtained by dividing into ten equal segments.

" る " (which reads "ru") is replaced to a vector train of "1, 1, 6, 6, 1, 7, 6, 4, 2, 8" as shown on the right side in FIG. 6. In step S52, the absolute value of a value in which the change amounts of the vector train of the stroke were added is added every stroke and the resultant value is divided by the number of strokes. The result of the division is set to a curvature. Since the vector train of " る " is equal to "1, 1, 6, 6, 1, 7, 6, 4, 2, 8", a change amount when the vector changes from 1 to 6 is equal to 5, a change amount when the vector changes from 6 to 1 is equal to −5, a change amount when the vector changes from 1 to 7 is equal to 6, a change amount when the vector changes from 7 to 6 is equal to −1, a change amount when the vector changes from 6 to 4 is equal to −2, a change amount when the vector changes from 4 to 2 is equal to −2, and a change amount when the vector changes from 2 to 8 is equal to 6. By adding those change amounts, the total change amount is equal to 7 (=5−5+6−1−2−2+6).

The quotient which is obtained by dividing 7 by the number 1 of strokes is equal to 7 and this value is used as a curvature of " る ". Similarly, in case of " い ", the change amounts are equal to "8, 8, 8, 8, 8, 8, 8, 8, 2, 2" and "8, 8, 8, 8, 8, 8, 7, 7, 7, 7". A change amount of " い " when the vector changes from 8 of the first stroke to 2 is equal to −6. The absolute value of −6 is equal to 6. A change amount of " い " when the vector changes from 8 of the next stroke to 7 is equal to −1 and its absolute value is equal to 1. Since the total change amount is equal to 7 (=1+6) and this value 7 is divided by the number 2 of strokes, so that 3.5 is obtained.

Similarly, in case of " 明 " (which reads "aka" and means "bright"), 6+1+6=13 and 13/8=1.625.

In step S53, a threshold value of the curvature which has been set in the RAM 82b is compared with a curvature of the input character, thereby judging whether the curvature of the input character is larger than the threshold value or not. If YES, step S54 follows. When the curvature is larger than the threshold value, it is determined in step S54 that the input character is "hirakana", so that the coordinate value of one character is sent to the recognizer 28 in FIG. 4.

When the curvature of the input character is not larger than the threshold value, step S56 follows. When the curvature of the input character is not larger than the threshold value, in step S56, it is decided that the input character is "kanji", so that the coordinate data of one character is sent to the recognizer 27 in FIG. 4.

For example, in the case where the threshold value of the curvature has been set to 3 in the RAM 82b, the input character whose curvature is larger than 3 is decided to be "large" in step S55. Since the curvature of " 肌 " is equal to 1.625, it is decided to be "small". The processing routine advances to step S56. Since the curvature of " る " is equal to 7, it is determined to be "large". The processing routine advances to step S54.

By executing the processes as described above, the input character such as " 肌 " which is constructed by straight line components is recognized by using the algorithm suitable for recognition of the straight line components. The input character such as " る " which is constructed by curve components is recognized by using the algorithm suitable for the recognition of the curve components. Consequently, the more accurate recognizing method can be realized.

What is claimed is:

1. A character recognition apparatus having a plurality of recognizing means, comprising:

input means for inputting a character pattern;

stroke extracting means for extracting strokes constructing a pattern from said inputted character pattern;

stroke curvature calculating means for calculating curvature of each of the strokes constructing the character pattern extracted by said stroke extracting means;

character curvature obtaining means for obtaining character curvature based on the stroke curvature for one character calculated by said stroke curvature calculating means; and deciding means for deciding a proper one of said plurality of recognizing means to select on the basis of a comparison between the character curvature obtained by said character curvature obtaining means and a predetermined threshold value as a means for recognizing feature data extracted from the input character pattern.

2. An apparatus according to claim 1, wherein said input means inputs coordinate data of the character pattern.

3. An apparatus according to claim 1, further having character extracting means for extracting a pattern of one character.

4. An apparatus according to claim 1, further having coordinate input means.

5. An apparatus according to claim 1, further having pen input means for inputting coordinates.

6. An apparatus according to claim 1, further having display means for displaying the result of the recognition of said feature data extracted from the inputted character pattern.

7. A character recognizing method having a plurality of recognition algorithms, comprising the steps of:

inputting a character pattern;

extracting strokes constructing a pattern from said inputted character pattern;

calculating curvature of each of the strokes constructing the character pattern;

obtaining character curvature based on the stroke curvature for one character calculated in said calculating step; and deciding a proper one of said plurality of recognizing algorithms to select on the basis of a comparison between the character curvature obtained in said obtaining step and a predetermined threshold value as a means for recognizing feature data extracted from the input character pattern.

8. A method according to claim 7, wherein said character pattern which is inputted is coordinate data.

9. A method according to claim 7, further having the step of extracting a pattern of one character from the inputted character pattern and, thereafter, extracting the strokes.

10. An apparatus according to claim 1, wherein each of said plurality of recognizing means includes a dictionary which stores reference patterns.

11. An apparatus according to claim 7, wherein each of said plurality of recognizing means includes a dictionary which stores reference patterns.

12. An apparatus according to claim 1, wherein each of said plurality of recognizing means includes a dictionary which stores reference patterns.

13. A computer-readable memory medium storing computer-executable process steps, the steps comprising:

an inputting step to input a character pattern;

an extracting step to extract strokes constructing a pattern from said inputted character pattern;

a calculating step to calculate curvature of each of the strokes constructing the character pattern;

an obtaining step for obtaining character curvature based on the stroke curvature for one character calculated by said calculating step; and a deciding step to decide a proper one of said plurality of recognizing algorithms to select on the basis of a comparison between the character curvature obtained by said obtaining step and a predetermined threshold value as a means for recognizing feature data extracted from the input character pattern.

14. A computer-readable memory medium storing computer-executable process steps according to claim 13, wherein the character pattern which is inputted is coordinate data.

15. A computer-readable memory medium storing computer-executable process steps according to claim 13, the steps further comprising an extracting step to extract a pattern of one character from the inputted character pattern and an extracting step to extract the strokes.

* * * * *

UNITED STATES PATENT AND TRADEMARK OFFICE
CERTIFICATE OF CORRECTION

PATENT NO. : 5,812,696

DATED : September 22, 1998

INVENTORS : Tsunekazu Arai, et al.         Page 1 of 2

It is certified that error appears in the above-identified patent and that said Letters Patent is hereby corrected as shown below:

COLUMN 1

Line 26, "recognition" should read --recognized--;
  Line 27, "a" (first occurrence) should be deleted;
  Line 31, "characters" should read --character--; and
  Line 41, "predicted" should read --predicted in--.

COLUMN 3

Line 7, "CPU)82." should read --CPU 82).--.

COLUMN 4

Line 2, "ith" should read --with--.

COLUMN 6

Line 19, " character" " should read --character--;
  Line 20, " ₂" " should read --"₂"--; and
  Line 21, "tíon" should read --tion--.

UNITED STATES PATENT AND TRADEMARK OFFICE
CERTIFICATE OF CORRECTION

PATENT NO. : 5,812,696

DATED : September 22, 1998

INVENTORS : Tsunekazu Arai, et al.

It is certified that error appears in the above-identified patent and that said Letters Patent is hereby corrected as shown below:

COLUMN 8

Line 26, "An apparatus" should read --A character recognizing method--; and

Line 27, "recognizing means" should read --recognition algorithms--.

Signed and Sealed this

Twenty-seventh Day of April, 1999

Attest:

Q. TODD DICKINSON

*Attesting Officer*     *Acting Commissioner of Patents and Trademarks*